No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 1.
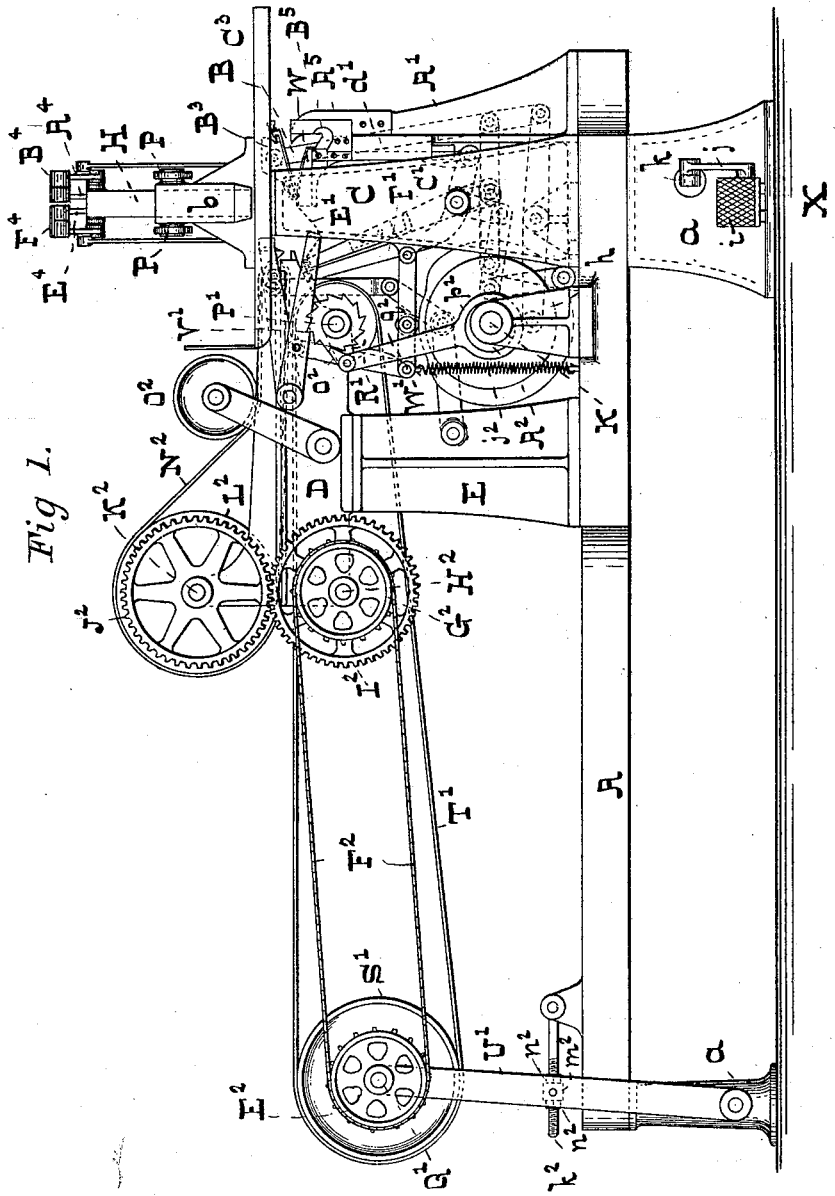
WITNESSES
Dan'l Fisher
Harry Constantine
INVENTOR
Hanson Robinson,
by Geo. W. T. Howard,
Atty.

No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 2.
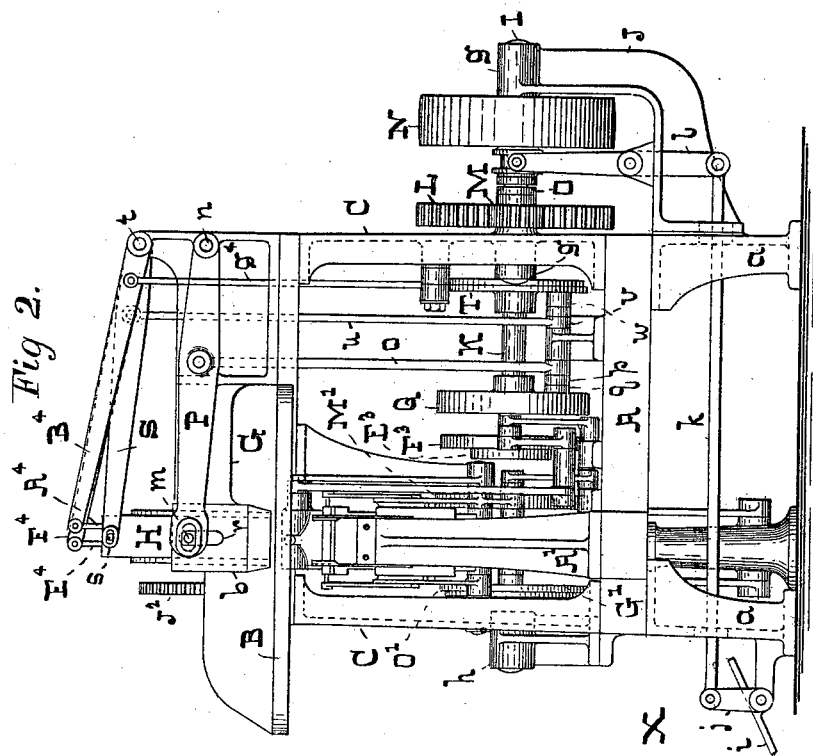
WITNESSES
Dan'l Fisher
Harry Constantine
INVENTOR
Harson Robinson,
by Wm. W. T. Howard,
atty.

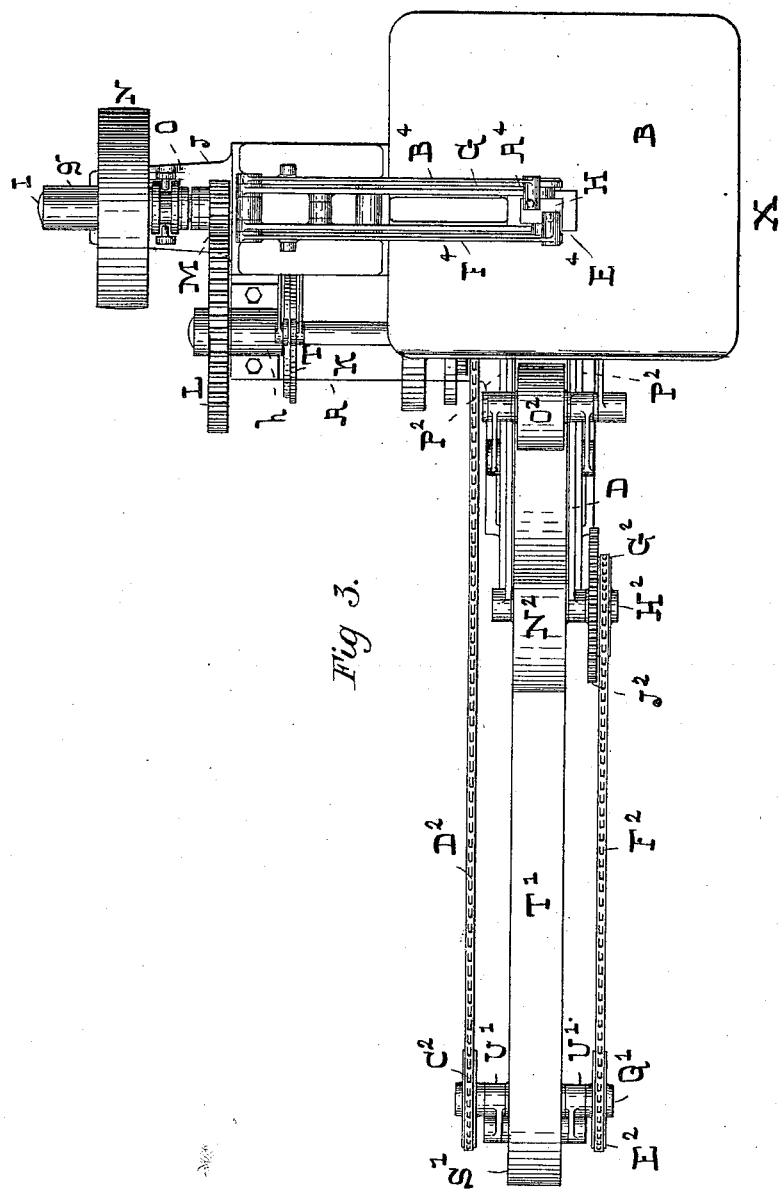

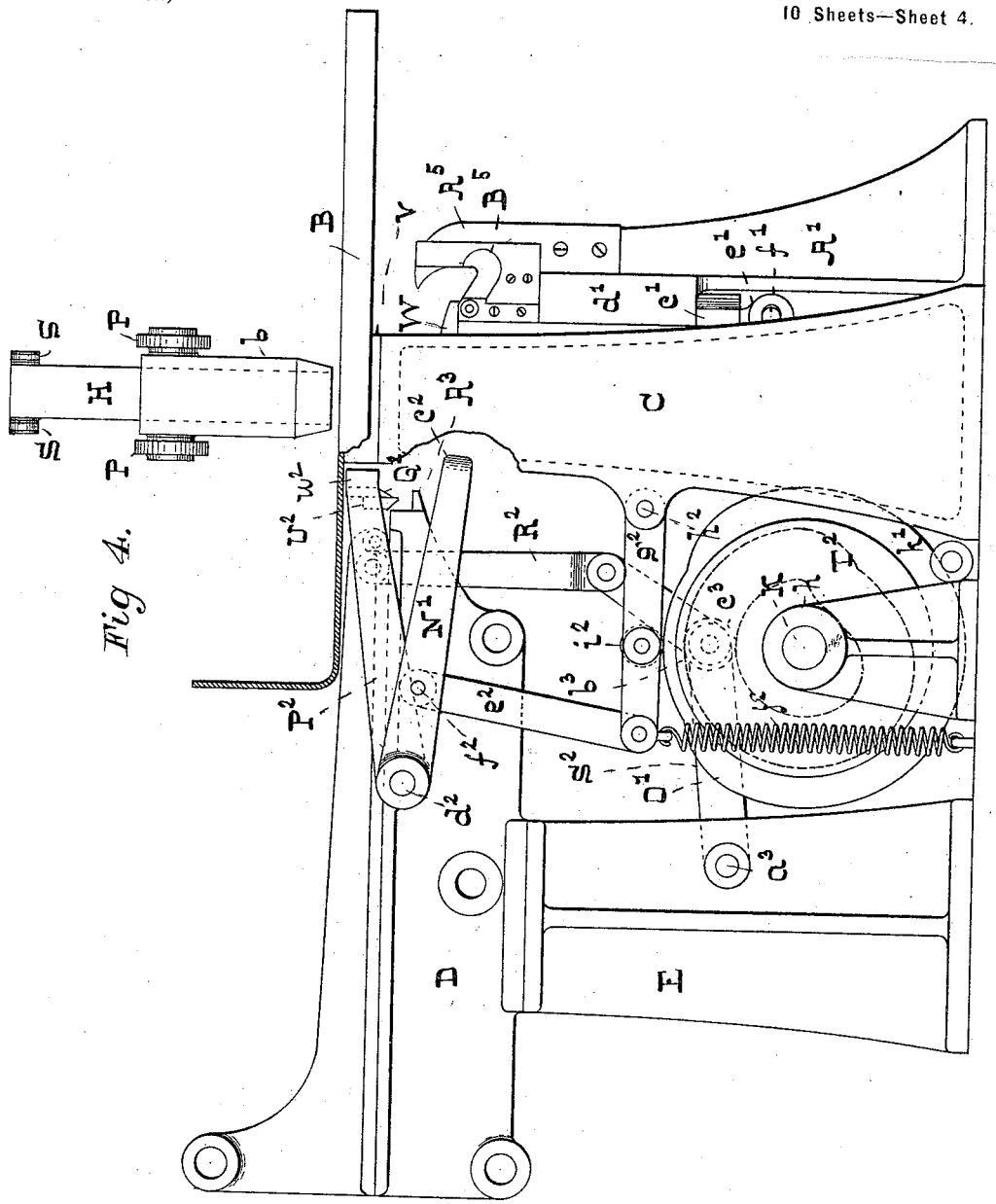

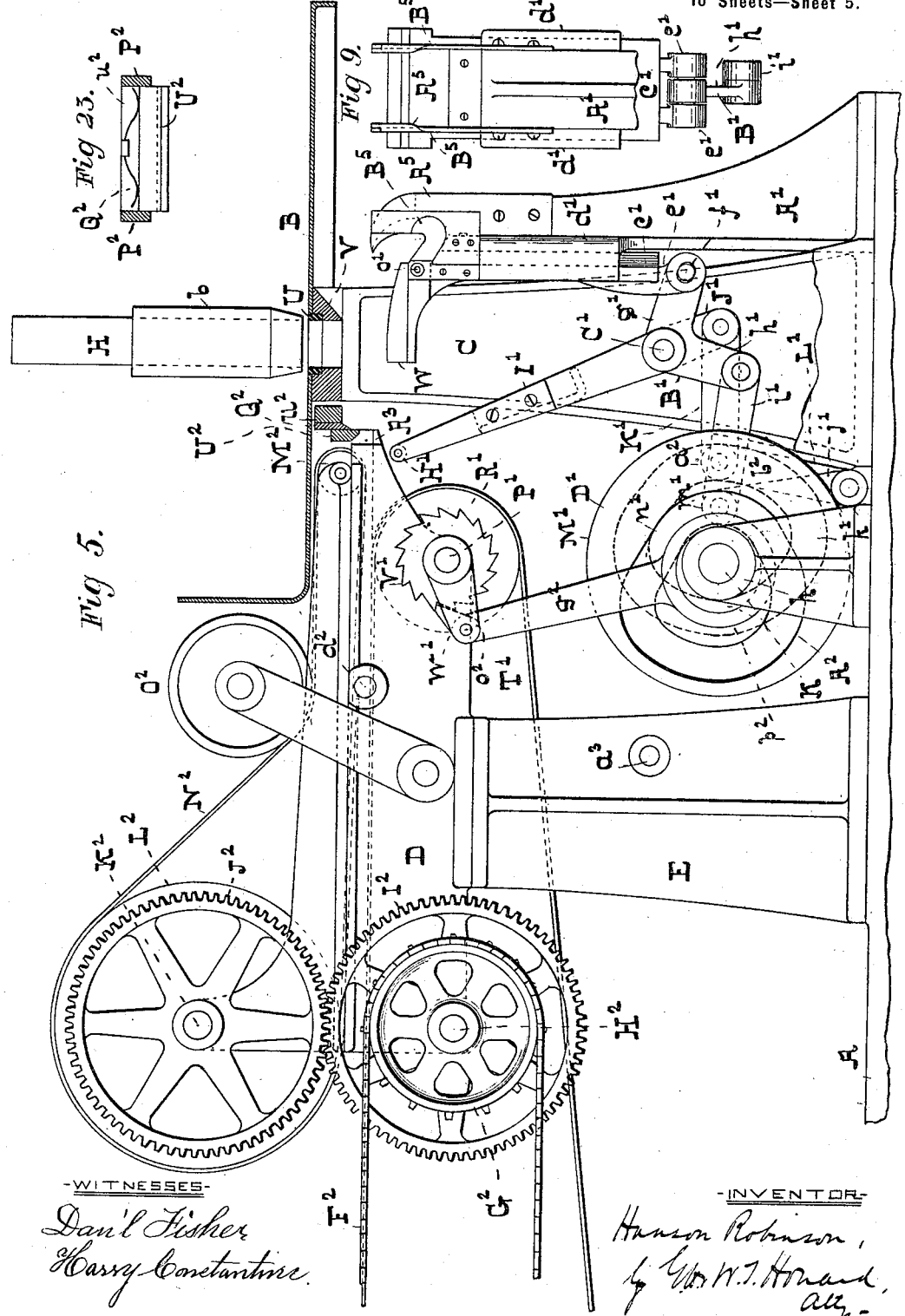

No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 6.
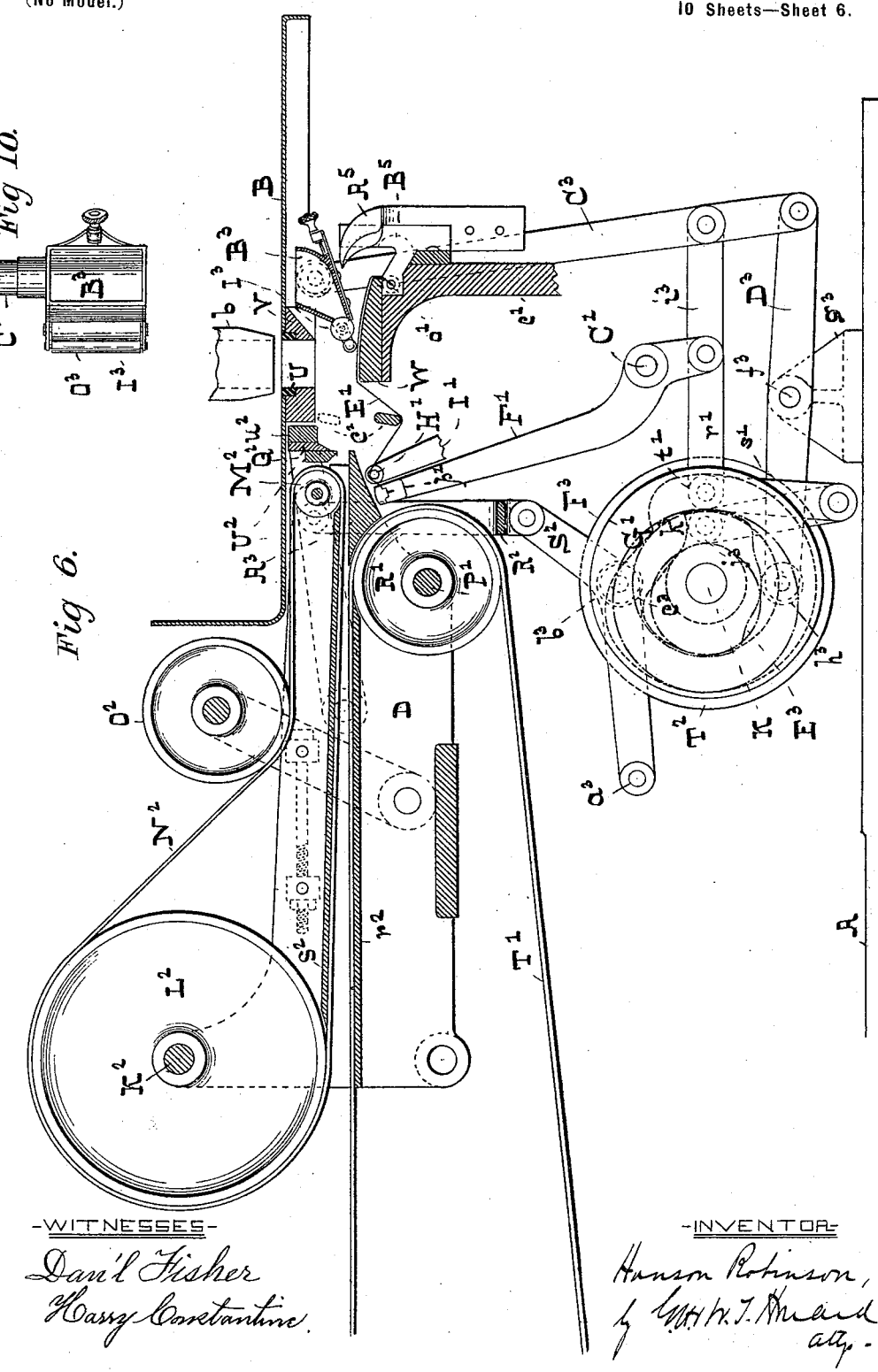

No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 7.
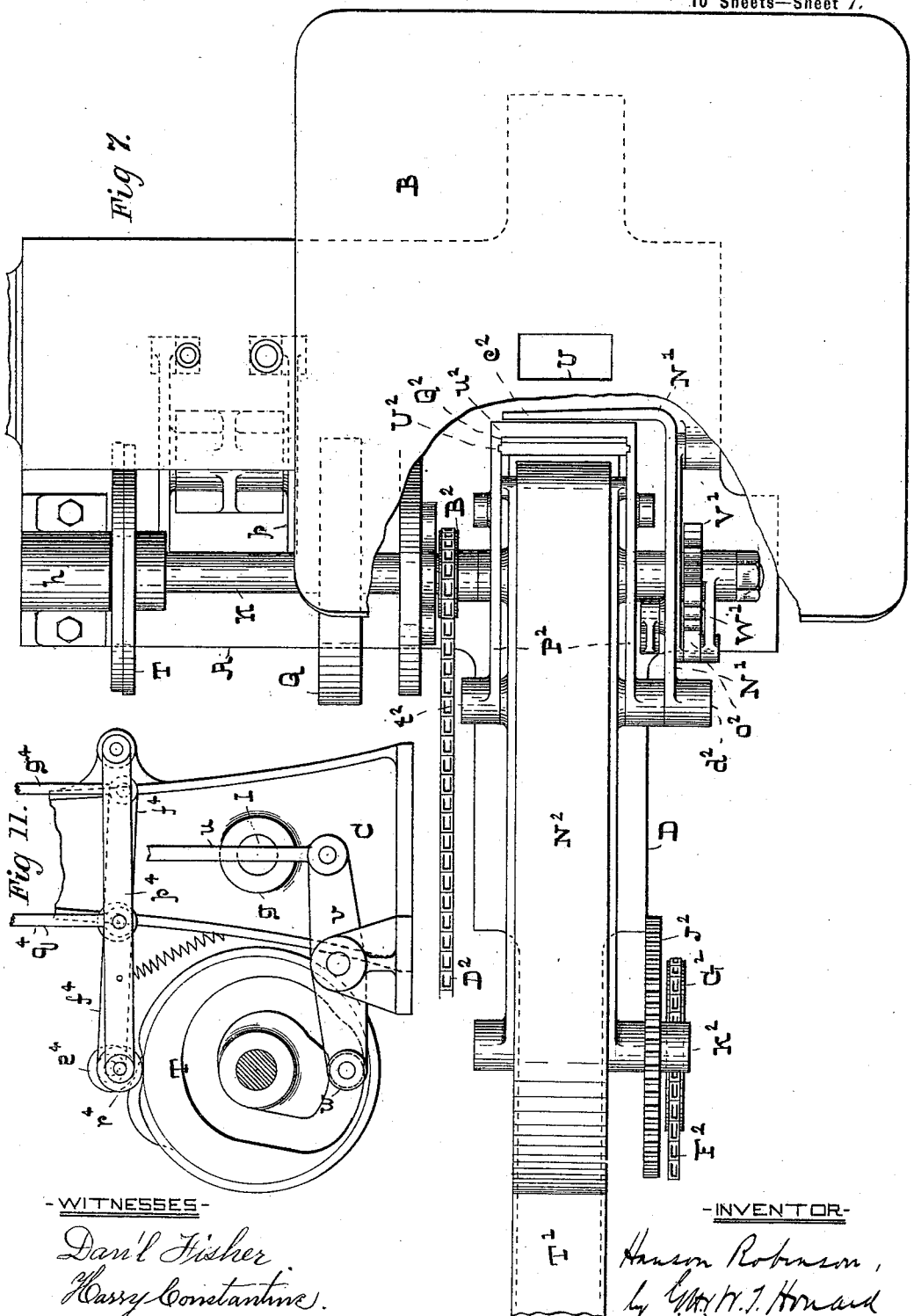
WITNESSES
Dan'l Fisher
Harry Constantine
INVENTOR
Hanson Robinson,
by Geo. W. J. Howard,
Atty.

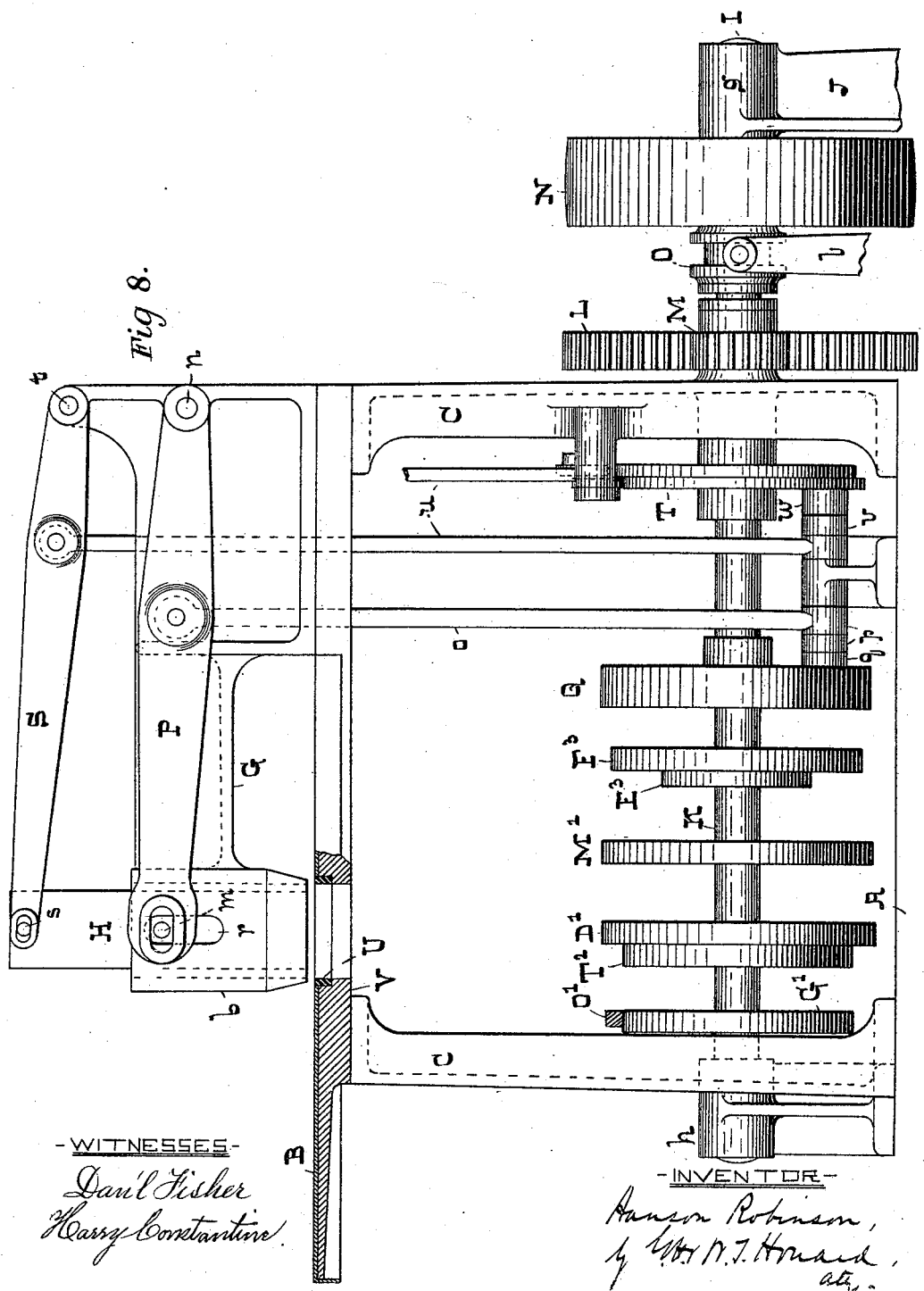

No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 9.
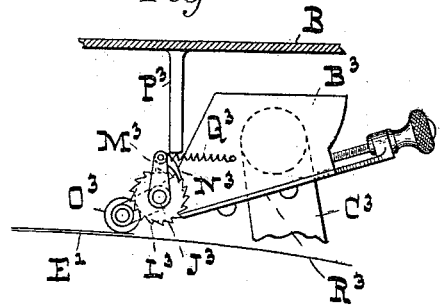
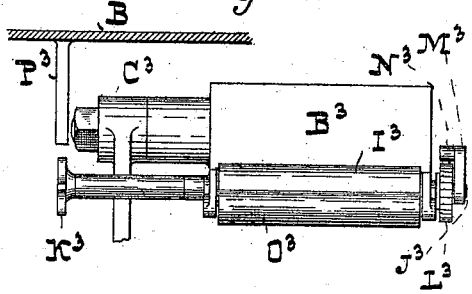
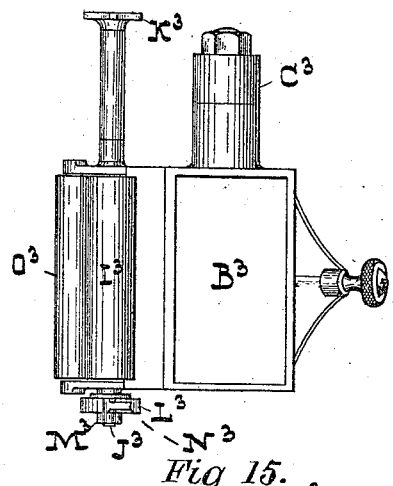
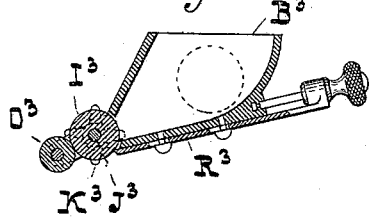
WITNESSES
Dan'l Fisher
Harry Constantine
INVENTOR
Hanson Robinson,
by W. T. Howard,
Atty.

No. 610,280. Patented Sept. 6, 1898.
H. ROBINSON.
MACHINE FOR MAKING ALL TOBACCO CIGARETTES.
(Application filed July 3, 1896.)
(No Model.) 10 Sheets—Sheet 10.
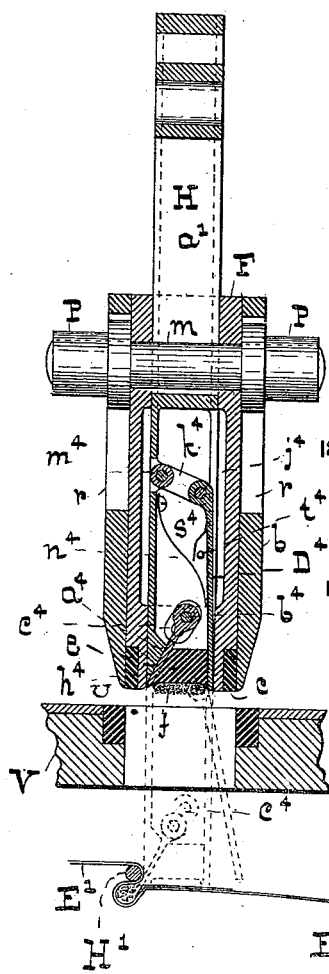
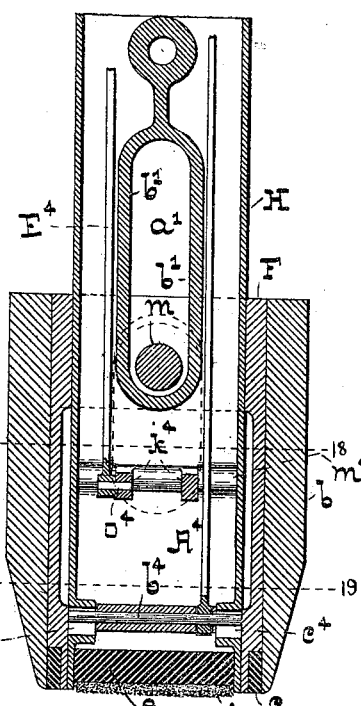
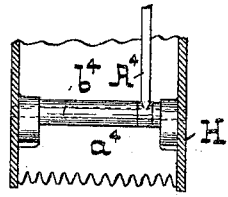
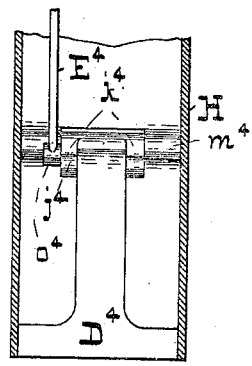
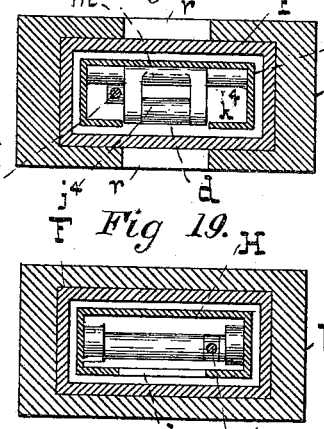
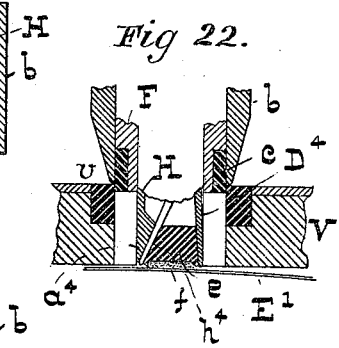
WITNESSES
Dan'l Fisher
Harry Constantine
INVENTOR
Hanson Robinson,
by Geo. W. T. Howard
Attys

UNITED STATES PATENT OFFICE.

HANSON ROBINSON, OF BALTIMORE, MARYLAND, ASSIGNOR, BY MESNE ASSIGNMENTS, TO THE UNITED STATES STANDARD MACHINE COMPANY, OF NEW JERSEY.

MACHINE FOR MAKING ALL-TOBACCO CIGARETTES.

SPECIFICATION forming part of Letters Patent No. 610,280, dated September 6, 1898.

Application filed July 3, 1896. Serial No. 598,053. (No model.)

*To all whom it may concern:*

Be it known that I, HANSON ROBINSON, of the city of Baltimore and State of Maryland, have invented certain Improvements in Machines for Making All-Tobacco Cigarettes, of which the following is a specification.

In the description of the said invention which follows reference is made to the accompanying drawings, forming a part hereof, and in which—

Figure 1 is an exterior side view. Fig. 2 is an exterior end view. Fig. 3 is a plan. Figs. 4 and 5 are exterior side views of certain parts of the machine on an enlarged scale. Fig. 6 is a partly-sectional side view of certain parts of the machine on an enlarged scale. Fig. 7 is an enlarged plan of certain parts of the machine. Fig. 8 is an enlarged end view of certain parts of the machine. Figs. 9 to 23, inclusive, are details of the machine, those shown in Figs. 12 to 21, inclusive, being on a scale greater than that used in the others.

Referring now to the drawings, A is a bed-plate supported by legs $a$.

B is a work-table supported from the bed-plate A by means of the stands C.

D is a frame sustained from the bed-plate A by the standard E.

F is a reciprocating punch of rectangular cross-section to cut wrappers from a leaf of tobacco. It is adapted to slide in a guide $b$ at the end of an overhanging frame G, bolted to the top of the work-table B. The punch F is a rectangular shell, of cast-iron, having a cutter $c$ at its lower end. This punch, together with certain other parts intimately connected therewith, is well shown in Figs. 16 to 22, inclusive. Of these Figs. 18 and 19 are cross-sections of Fig. 17, taken, respectively, on the dotted lines 18 and 19.

H is a wrapper-carrier consisting of a shell of rectangular cross-section adapted to slide in the punch F. This wrapper-carrier has an opening $d$ in one side for a purpose hereinafter described. At the lower end of the wrapper-carrier is a block $e$, the outer surface of which is covered with a sheet $f$, of soft rubber or some other suitable substance, which in the operation of the carrier bears upon the leaf wrapper.

I is the driving-shaft, supported in bearing-boxes $g$, one of which is a part of a bracket J, extending from one of the legs $a$, and the other a part of the stand C. (See Figs. 2 and 11.)

K is the secondary shaft, driven from the driving-shaft I by means of the spur gear-wheel and the spur-pinion, (respectively denoted by L and M.) The secondary shaft is sustained in bearing-boxes $h$, fastened to the bed-plate A.

N is the driving-pulley, which runs loose on the driving-shaft I, and O a clutch arranged to slide on a feather on the shaft. This clutch when moved toward the driving-pulley engages with a clutch-face (not shown) on its face, and the shaft is placed in revolution. The clutch is operated by the foot of the attendant through the medium of a treadle $i$, arm $j$, link $k$, and clutch-lever $l$. (See Fig. 2.)

The secondary shaft K is the source of movement of all operative parts of the machine.

Extending laterally through the punch F is a pin $m$, to the ends of which are connected the levers P, fulcrumed at $n$ to the overhanging frame G. The levers P are operated by the slotted cam Q through the medium of the rod $o$, rocking cam-lever $p$, and the roller $q$, which is in the cam-slot. To permit of the up-and-down movement of the pin $m$, the punch-guide is slotted, the slot being denoted by $r$.

To effect the vertical reciprocating movement of the wrapper-carrier H, it is provided with a pin $s$ in a similar manner to the punch, and to the ends of this pin are attached the levers S, fulcrumed at $t$ to the overhanging frame G. These levers are moved by the cam T through the agency of a rod $u$, rocking cam-lever $v$, and the roller $w$, which rests in a slot in the said cam. A face view of this cam is shown in Fig. 11.

To allow of the independent motions of the punch F and the wrapper-carrier H, the latter has a slot $a'$, through which the pin $m$ passes. The metal around the slot $a'$ is denoted by $b'$.

U is the die, which coöperates with the punch F to cut the wrappers. It is situated in the work-table B (see particularly Fig. 16) and secured to a cross-piece V, supported by the stand C.

W is a vertically-reciprocating rolling-up table having an underneath extension $c'$, which rests and is adapted to slide between two jaws $d'$, formed as parts of a stand $A'$, erected on the bed-plate A. To effect the vertical sliding movement of the table W, the underneath extension $c'$ thereof is provided with two lugs $e'$, connected by a pin $f'$, and to this pin is attached the arm $g'$ of a bell-crank $B'$ on a shaft $C'$. The other arm $h'$ of the said bell-crank is connected to a link $i'$, jointed to the end of an arm $j'$, pivoted to a lug $k'$ on the bed-plate A. At the junction of the arm $j'$ and the link $i'$ is a roller $m'$, which rests in the slot $n'$ of the cam $D'$.

The rolling-up table W is shown in its lowest position in Figs. 5 and 6, and the stroke of the cam-slot $n'$ is such that in the operation of the cam the table is carried up into contact with the under side of the cross-piece V, in which is situated the die U. (See Fig. 22.)

$E'$ is the rolling-up apron, one end of which is attached to a rod $o'$, (see Fig. 6,) while the other end is connected to a rod $p'$, which unites the ends of two stretching-levers $F'$, adapted to vibrate on the shaft $C'$. The lower and shorter arms of the levers $F'$ are jointed to a link $r'$, connected to an arm $s'$, pivoted to the bed-plate A, and at the point of union between the link and arm is situated a roller $t'$, which rests in the slot $u'$ of the cam $G'$. In the operation of this cam the apron $E'$ is alternately slackened and tightened.

H is the forming-roller, supported by the levers $I'$, which vibrate on the shaft $C'$. Their lower and shorter arms $J'$ are jointed to a link $K'$, which in turn are jointed to a rocking arm $L'$, pivoted to the bed-plate A.

At the junction of the arm $L'$ and the link $K'$ is a roller $a^2$, resting in a slot $b^2$ on the face of the cam $M'$. The stroke of the cam $M'$ is such that the forming-roller is carried from the position shown in Figs. 5 and 6 over the rolling-up table to the extreme end thereof and back again.

$N'$ is an arm, a portion $c^2$ of which is bent at a right angle with the remainder to form a device whereby a pocket or loop is produced in the rolling-up apron $E'$. This arm is adapted to vibrate on a pin $d^2$, which projects from the frame D, and it is operated by a link $e^2$, which is jointed to it at $f^2$. The lower end of this link $e^2$ is jointed to an arm $g^2$, hinged at $h^2$ to the stand C and having a roller $i^2$, which rests on the edge of a cam $O'$. A spring $j^2$ serves to carry the angular portion of the arm $N'$ from its highest position (shown only on dotted lines in Fig. 6) to its lowest position, (shown in Figs. 4 and 6,) where it strikes the rolling-up apron and forms a loop or pocket therein to receive the filler introduced thereto, as hereinafter described. The upward movement is effected by the cam alone.

$P'$ and $Q'$ are shafts carrying, respectively, the drums $R'$ and $S'$, over which is stretched the lower filler-feeding belt $T'$. The shaft $Q'$ revolves in bearing-boxes formed at the ends of arms $U'$, pivoted to the leg $a$ to the left of the machine, as shown in Fig. 1. The belt $T'$ is tightened by means of a hinged bolt $k^2$, which passes through a lug $m^2$ between the arms $U'$ and adjusting-nuts $n^2$. The shaft $P'$ is journaled in the frame D and at one end is provided with a ratchet-wheel $V'$ and a vibratory arm $W'$, carrying a pawl $o^2$, which bears on the ratchet-teeth. The arm $W'$ is vibrated by an eccentric $A^2$ through the medium of an eccentric-strap $p^2$ and rod $q^2$. The shaft $P'$ has a sprocket-wheel $B^2$, which drives a similar sprocket-wheel $C^2$ on the shaft $Q'$ by means of an endless chain $D^2$. The movement of the shaft by means of the sprockets, as described, does not affect the motion of the drum $S'$, as that device is loose on the shaft $Q'$.

A second sprocket-wheel $E^2$ on the shaft $Q'$, in connection with a sprocket-chain $F^2$, drives a sprocket-wheel $G^2$ on a stud $H^2$.

A spur gear-wheel $I^2$, fastened to the stud $H^2$, so as to revolve with the sprocket-wheel $G^2$, drives the second spur-gear $J^2$ on a shaft $K^2$, supported by the frame D. On this shaft $K^2$ is a drum $L^2$, which, together with a small idle-drum $M^2$, carries the upper filler-feeding belt $N^2$. The lower section of the belt is in an inclined position with reference to the lower belt, as shown in Fig. 6, in order to compress the filler as it advances to the cutting-off mechanism, hereinafter described.

$O^2$ is a tightening-pulley for the upper belt $N^2$. The adjacent sections of the belts $T'$ and $N^2$ are sustained against deflection by plates $r^2$ and $s^2$. (Shown in section in Fig. 6.)

$P^2$ $P^2$ are arms, one of which is loose on the stud $d^2$ and the other loose on a similar stud $t^2$ in alinement with the first. The ends of these arms are connected by a bar $u^2$, which forms a carrier for the knife $Q^2$.

$R^2$ is a branched link which unites the arms $P^2$ with a bent arm $S^2$, pivoted at $a^3$ to the stand E. At the angle $b^3$ of the bent arm $S^2$ is a roller $c^3$, which rests in a cam-slot in the cam $T^2$. By this means the knife has an up-and-down movement.

$U^2$ is a spring-held compressor (see particularly Fig. 23) which moves with and in advance of the cutting edge of the knife $Q^2$ down onto the continuous filler as it emerges from under the upper feeding-belt. The feeding-belts deliver the filler onto a bridge-piece $A^3$, the edge of which serves as a secondary member of the cutting device, the knife $Q^2$ being the first one.

$B^3$ is a paste-pot. (Shown on an enlarged scale in Figs. 12, 13, 14, and 15.) It is hinged to an arm $C^3$, pivoted to a rocking arm $D^3$, fulcrumed at $f^3$ to a stand $g^3$ on the bed-plate A.

The free end of the rocking arm $D^3$ has a roller $h^3$, which rests on a cam $E^3$. This cam has the effect of giving to the paste-pot an up-and-down movement. In addition to this up-and-down movement the paste-pot has a vibratory movement toward and from the rolling-up table. This is effected by a cam $F^3$ through the medium of a link $i^3$, having at one end a roller $j^3$, which is in a slot $k^3$ in the said cam, and at the other end jointed to the paste-pot arm $C^3$. By means of the actuating devices described the paste-pot, after moving over the rolling-up table, is drawn onto the apron thereon, or, rather, onto the leaf wrapper, which at that time is on the apron. The paste-pot is open at the top and also at the front side, and in the latter opening is a paste-distributing roller $I^3$, which is loose on the shaft $J^3$. On one end of this shaft is a tight star-wheel $K^3$ and on the other a loose ratchet-wheel $L^3$ and a tight arm $M^3$, carrying a pawl $N^3$, which engages with the ratchet-teeth. The ratchet-wheel $L^3$ is secured to the hub of the paste-distributing roller $J^3$. $O^3$ is the pasting-roll in contact with the paste-distributing roller $J^3$. At each intermittent movement of the roller $J^3$ a certain quantity of paste is transferred from it to the pasting-roll $O^3$.

$P^3$ is a lug dependent from the under side of the work-table B with which the star-wheel $K^3$ engages in the movement of the paste-pot effected as hereinbefore described, and thereby causes the pasting of the roll $O^3$. A spring $Q^3$ serves to move the pawl $N^3$ in one direction.

The quantity of paste taken from the box by the distributing-roller $J^3$ is regulated by the adjustable gate $R^3$. (Shown particularly in Fig. 15.) The pasting of the wrapper is effected by the pasting-roll $O^3$ coming in contact with it while it is stationary or fixed, its movement taking place after it has been lifted from the wrapper.

Within the wrapper-carrier H is a plate $a^4$ with a serrated lower edge, which is connected to the carrier by means of a pin $b^4$, the ends of which are in inclined slots $c^4$.

$A^4$ is a rod with its lower end attached to the pin $b^4$. Its upper end is jointed to a lever $B^4$, fulcrumed at $d^4$ to the same pin as the lever S. This lever $B^4$ is operated by the periphery of the cam T through the medium of a roller $e^4$, lever $f^4$, and rod $g^4$, which at its upper end is jointed to the lever $B^4$. The plate $a^4$ rests in an inclined slot $h^4$ in the block $e$. (See Fig. 16.) The object of the plate $a^4$ is to hold the edge of the wrapper within the loop of the rolling-up apron until the forming-roller has caused the filler to pass over it, and thereby prevent any displacement of the wrapper. After the edge of the wrapper is caught the plate $a^4$ rises out of the way of the forming-roller.

$D^4$ is a finger to straighten out the free portion of the wrapper while its edge is held on the rolling-up apron. This finger is hinged within the wrapper-carrier at $j^4$ to a link $k^4$, which in turn is hinged at $m^4$ to inside of the wrapper-carrier. A spring $n^4$ serves to keep the finger $D^4$ tightly against the wall of the punch, the carrier being open at that point, and while the carrier is within the punch F the finger is held in the position shown in Fig. 16.

$E^4$ is a rod jointed at its lower end to the link $k^4$ at $o^4$ and at its upper end jointed to an arm $F^4$, which is fulcrumed to the same pin or shaft as is the lever $B^4$. The arm $F^4$ is connected to a hinged arm $p^4$ like the one $f^4$ by a rod $q^4$, and the arm $p^4$ is operated by the periphery of the cam T, before referred to, through the medium of a roller $r^4$.

In order that the finger $D^4$ may be retained in its closed position for some time after the punch shall have moved upward, the finger is provided with a latch $s^4$, which hooks over a pin $t^4$, projecting from the wall of the wrapper-carrier. It will be understood that upon the beginning of the upward movement of the lifting rod $E^4$ the latch is lifted from the pin, and the spring $n^4$ forces the finger out to the position shown by its dotted delineation in Fig. 16.

The means for cutting off the ends of the rough cigarette consist of two curved fixed knives $A^5$, one of which is secured to each side of the stand A', and two hooked knives $B^5$, secured to the rolling-up table W and adapted to move with the table between the fixed knives.

Supposing the machine to be in operation and the space between the feed-belts occupied with a continuous filler, the attendant who stands at X in Figs. 1, 2, and 3 places a leaf of tobacco over the die and under the punch, which is at its highest point and about to descend. At this time the forming-roller and the rolling-up apron are in the positions shown in Fig. 6 and the loop-forming device in the elevated position shown by its dotted delineation in that figure. The paste-pot is elevated and moved back, so as to be out of the way of the wrapper and the mechanism which deposits the wrapper on the apron. The punch now descends and cuts a wrapper from the leaf held by hand over the die, and the wrapper-carrier pushes the wrapper down toward the rolling-up table, which table rises and meets the wrapper at the under side of the work-table. After the deposit of the wrapper on the rolling-up table the punch ascends and the rolling-up table, together with the wrapper and the wrapper-carrier, descends until the rolling-up table assumes its original position. The loop-forming device now descends to the position shown in full lines in Fig. 6 and then ascends. About the same time the charge of filler is cut from the continuous filler and falls to the loop in the apron, and the forming-roller and apron-stretcher move toward the rolling-up table. The filler is thus inclosed in an elongated loop, which is contracted in size by the return movement of the apron-stretcher, and the filler is left in a nearly circular loop, as shown in Fig. 16. About this time the plate $a^4$ is forced down and the edge of the wrapper pressed into the loop, as shown in Fig. 16 in dotted lines, and as the wrapper-carrier moves upward the finger $D^4$ is pushed down until its lower edge touches the wrapper, and then the finger sweeps outward to straighten the wrapper, which at that time is firmly held by the filler. The plate $a^4$ and the finger $B^4$ now ascend, and as the forming-roller moves onto the rolling-up table the paste-pot is moved toward the forming-roller and downward until the small pasting-roll touches the wrapper and effects the pasting operation. As the forming-roller advances the paste-pot moves up and back, so that the forming-roller may complete the rolling-up operation. The cigarette thus formed falls onto the lower knives $B^5$, where it remains until the rolling-up table, carrying the cigarette on its knives, causes the said knives to engage with the stationary ones $A^5$, and the cigarette is thus clipped and falls to any receptacle placed for its reception.

It will be understood that the various cams used are so constructed as to effect the variations of movement and operations described at the proper time.

I disclaim, in a machine for making all-tobacco cigarettes, the combination of a punch and die, a rolling-up table and apron beneath the said punch and die, a reciprocating presser-plate adapted to move from a position within the punch to the apron, and means to effect such movement, and a forming-roller, with means to operate it, so arranged and timed as to bring the forming-roller over the edge of a wrapper delivered to the apron by the presser-plate and before the beginning of the upward stroke of the said presser-plate; but

What I claim as my invention is—

1. In a machine for making all-tobacco cigarettes, the combination of a rolling-up table and apron, a forming-roller with means to operate it, a die, a punch and actuating devices, a wrapper-carrier within the punch with devices to operate it, and a finger within the carrier with means to force it down into the loop formed in the rolling-up apron to hold the wrapper in position until the edge of the wrapper is caught by the filler in the rolling-up operation, substantially as specified.

2. In a machine for making all-tobacco cigarettes, the combination of a rolling-up table and apron, a forming-roller with means to actuate it, a die, a vertically-moving punch with means to operate it, a wrapper-carrier having mechanism for moving it independently of the punch, a wrapper-straightening finger hinged within the said wrapper-carrier and a spring to force out the said finger so as to straighten out the wrapper after its edge has been caught by the filler, substantially as specified.

3. In a machine for making all-tobacco cigarettes, a vertically-moving rolling-up table having a pair of upwardly-hooked knives attached to its discharge end, adapted to receive and hold a cigarette as it is delivered from the said table, combined with a pair of fixed inwardly-hooked knives which project over the movable ones, whereby in the upward movement of the table the cigarette is carried with it and its ends clipped off by the coöperation of the two pairs of knives, substantially as specified.

4. In a machine for making all-tobacco cigarettes, the combination of a vertically-moving rolling-up table and apron, a paste-pot and pasting-roller which receives paste from the said pot, and means to give the said pot and roller, a vertical as well as a forward-and-backward movement, substantially as specified.

HANSON ROBINSON.

Witnesses:
DANL. FISHER,
WM. T. HOWARD.